United States Patent
Sugihara

(10) Patent No.: US 12,353,983 B2
(45) Date of Patent: Jul. 8, 2025

(54) INFERENCE DEVICE AND METHOD FOR REDUCING THE MEMORY USAGE IN A WEIGHT MATRIX

(71) Applicant: Mitsubishi Electric Corporation, Tokyo (JP)

(72) Inventor: Kenya Sugihara, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 1049 days.

(21) Appl. No.: 17/358,167

(22) Filed: Jun. 25, 2021

(65) Prior Publication Data

US 2021/0319299 A1    Oct. 14, 2021

Related U.S. Application Data

(63) Continuation of application No. PCT/JP2019/000612, filed on Jan. 11, 2019.

(51) Int. Cl.
*G06N 3/063* (2023.01)
*G06F 7/523* (2006.01)
*G06F 7/78* (2006.01)

(52) U.S. Cl.
CPC .......... *G06N 3/063* (2013.01); *G06F 7/523* (2013.01); *G06F 7/78* (2013.01)

(58) Field of Classification Search
CPC .......... G06N 3/063; G06F 7/523; G06F 7/78
See application file for complete search history.

(56) References Cited

U.S. PATENT DOCUMENTS 11,836,082 B2 * 12/2023 Oh .................. G06N 3/048
2015/0199266 A1 * 7/2015 Franchetti ........... G06F 15/76
711/117

(Continued)

FOREIGN PATENT DOCUMENTS

| JP | 6054005 B1 | 12/2016 |
| JP | 6183980 B1 | 8/2017 |
| JP | 2018-109870 A | 7/2018 |

OTHER PUBLICATIONS

Chetlur et al., "cuDNN: Efficient Primitives for Deep Learning," arXiv:1410.0759v3, Dec. 18, 2014, pp. 1-9.

(Continued)

*Primary Examiner* — Jennifer N Welch
*Assistant Examiner* — Quoc Ly Phu Phung
(74) *Attorney, Agent, or Firm* — Birch, Stewart, Kolasch & Birch, LLP

(57) ABSTRACT

Included in an inference device of a neural network are: a memory for storing a layer on an input side and weight data for generating a matrix multiplication using the layer on the input side; and a processor for generating a layer on an output side, by using the layer on the input side and the weight data for generating the matrix multiplication using the layer on the input side, in which, out of a plurality of rows and columns including zero elements and non-zero elements in the weight data, the memory stores only non-zero weights and position information of the non-zero weights and the number of non-zero elements in each of the rows is approximately the same. Therefore, it is possible to reduce the amount of memory in a memory for storing learned weight data of a weight matrix. It is also possible to reduce the amount of memory of a memory for storing positions of non-zero weight elements of the weight matrix.

5 Claims, 3 Drawing Sheets

20 × 20 Weight Matrix

Data Stored in Memory

(56) References Cited

U.S. PATENT DOCUMENTS

| | | | |
|---|---|---|---|
| 2017/0193361 A1* | 7/2017 | Chilimbi | G06N 3/084 |
| 2018/0046895 A1* | 2/2018 | Xie | G06N 3/063 |
| 2018/0053085 A1 | 2/2018 | Matsumoto et al. | |
| 2018/0210862 A1* | 7/2018 | Akerib | G06F 17/16 |
| 2019/0108436 A1* | 4/2019 | David | G06N 3/086 |
| 2019/0164538 A1* | 5/2019 | Seo | G10L 15/16 |
| 2020/0005131 A1 | 1/2020 | Nakahara et al. | |
| 2020/0042856 A1* | 2/2020 | Datta | G06N 3/045 |
| 2020/0401895 A1* | 12/2020 | Litvak | G06N 3/02 |
| 2021/0133542 A1* | 5/2021 | Holm | G06N 3/044 |
| 2021/0216871 A1* | 7/2021 | Zhang | G06N 3/063 |
| 2021/0226834 A1* | 7/2021 | Shattil | H04L 27/2621 |
| 2022/0335272 A1* | 10/2022 | Elsen | G06N 3/045 |

OTHER PUBLICATIONS

Fujii et al., "A Memory Reduction with Neuron Pruning for a Binarized Deep Convolutional Neural Network: Its FPGA Realization," IEICE Technical Report, vol. 117, No. 221, Sep. 18, 2017, pp. 25-30.

International Search Report (PCT/ISA/210) issued in PCT/JP2019/000612, dated Apr. 16, 2019.

Kuroda et al., Performance of Autormatically Tuned Parallel Sparse Linear Equations Solver, IPSJ SIG Technical Reports, vol. 99, No. 38, May 14, 1999, pp. 13-18.

Matsui et al., "A Study of Kernel Clustering for Reducing Memory Footprint of CNN," IEICE Technical Report, vol. 117, No. 479, Feb. 28, 2018, pp. 185-190.

Notice of Reasons for Refusal issued in Japanese Application No. 2019-534778, dated Oct. 8, 2020.

\* cited by examiner

Structure of Weights of
Convolutional Filters

Weight Matrix W

20 × 20 Weight Matrix

Data Stored in Memory

INFERENCE DEVICE AND METHOD FOR REDUCING THE MEMORY USAGE IN A WEIGHT MATRIX

CROSS REFERENCE TO RELATED APPLICATION

This application is a Continuation of PCT International Application No. PCT/JP2019/000612, filed on Jan. 11, 2019, which is hereby expressly incorporated by reference into the present application.

TECHNICAL FIELD

The present invention relates to an inference device and an inference method using a neural network.

BACKGROUND ART

As one of machine learning methods, neural networks have high capabilities in solving problems and are used in many processes such as image recognition, sound recognition, abnormality detection, and future prediction.

A neural network can be represented by a graph structure including a plurality of nodes (nodal points) and edges (branches) connecting between the nodes. Typical structures of neural networks include multi-layer perceptrons (hereinafter referred to as MLPs), convolutional neural networks (hereinafter referred to as CNNs), and recurrent neural networks (hereinafter referred to as RNNs). In addition, there are mainly two types of learning methods: supervised learning and unsupervised learning.

An MLP is a hierarchical neural network. For example, in a four-layer MLP, a plurality of nodes is layered by an input layer, a first intermediate layer, a second intermediate layer, and an output layer, and there are no branches between nodes belonging to a same layer, and there are edges only between adjacent layers. An intermediate layer is also called a hidden layer. Each of the edges has a parameter representing a degree of connection between two nodes that are connected. This parameter is called a branch weight. In each node in each layer other than the input layer, an operation is performed by multiplying each value output from a node in a preceding layer (a layer on the input layer side of the layers connected by an edge) by a weight of the edge that is connected. There are as many operation results of products obtained in this manner for each node as the number of edges that are connected, and a process of calculating the sum of these products.

A CNN is a neural network of a hierarchical structure using a layer called a convolutional filter or kernel. A convolutional filter has a two-dimensional or a higher-dimensional grid-like structure, and multiplication is performed with a parameter of each cell and input data, and the sum is calculated. A parameter of the convolutional filter is called a weight of the convolutional filter.

In MLPs and CNNs, data is passed in one direction from an input layer to an output layer whereas, unlike these, a neural network having a layer of a recurrent structure is an RNN. In RNNs, series data is input to an input layer in order, and an operation is performed on the current input value in the series with a past value (future value may be used). Long short-term memories (LSTMs) and gated recurrent units (GRUs) are known as one type of RNNs. There is a plurality of types of operations performed in a layer having a recurrent structure, and there are operations that perform multiplication of a certain parameter value and an input value and operations that perform multiplication of a certain parameter value and a past value, and a parameter used in these multiplications is called a weight.

Let us call branch weights of MLPs, weights of convolutional filters of CNNs, and weights used in multiplications of a recurrent structure of RNNs are simply called weights of neural networks.

Supervised learning is a method of fine-tuning a weight value of neural networks described above so that actual output and target output match with each other where input data of a plurality of training examples and the target output are given. Meanwhile, unsupervised learning is a method of fine-tuning a weight value of a neural network so that an essential feature of a training example can be extracted without providing target output. If a weight value is successfully fine-tuned by learning, a neural network can output a desired value such as a target value for input data. An operation performed by a trained neural network is called inference.

When inference is performed using a trained neural network, the amount of operation and the amount of memory increase as the number of non-zero values increases among the weights of the neural network.

For example, in a case where the number of nodes in the input layer of the four-layer MLP is N, the number of nodes in the first intermediate layer is M1, the number of nodes in the second intermediate layer is M2, and the number of nodes in the output layer is 1, then the number of branches between the input layer and the first intermediate layer is N×M1, the number of branches between the first intermediate layer and the second intermediate layer is M1×M2, and the number of branches between the second intermediate layer and the output layer is M2. It is necessary to perform multiplication as many times as the number of branch weights associated with these branches, and multiplication is required at least (N×M1+M1×M2+M2) times when inference is performed. Likewise, the amount of memory is required as many as the number of branch weights. In neural networks, there are also operations of the sum or activation functions in addition to multiplication using weights, but still, in general, the amount of operation and the amount of memory related to the above multiplication are larger in many cases.

Products and the sum of weights of the neural network and input data in each layer can be expressed in the form of multiplication of a vector or a matrix. For example, in the example of the above four-layer MLP, in a case where the output of the input layer is expressed by vector X of N elements, a result of the sum of products at the respective nodes in the first intermediate layer (product-sum operation result) is expressed by vector Y of M1 elements, and the weights of N× M1 branches by which the nodes of the first intermediate layer are connected with the input layer is expressed by matrix W of M1×N, Y=WX holds. Matrix W is called a weight matrix. Similarly, in a case of an RNN, product-sum operation can be expressed by multiplication of weight matrix W and a vector of input or and multiplication of W and a vector of past values. In a case of a CNN, as in Patent Literature 1, by expressing the weights of a convolutional filter by weight matrix W and transforming input data X and product-sum operation result Y into a matrix, it is possible to express the product-sum operation in the form of a product of the matrix Y=WX.

Therefore, if non-zero elements of a weight matrix of a neural network can be reduced and the zero elements can be increased, the amount of operation or the amount of memory can be reduced. This is because each weight is used for multiplication with an output value of a preceding layer, therefore, in a case where a weight value is zero, the multiplication result is zero regardless of the value of input data. Therefore, multiplication operation can be omitted in principle.

In Patent Literature 1, in an MLP, the amount of operation or the amount of memory is reduced, by maintaining the number of none-zero branch weights at less than or equal to 50 on the average, by using activity, among branches between nodes of an intermediate layer and an input layer.

CITATION LIST

Patent Literature

Patent Literature 1: Japanese Patent No. 6054005

SUMMARY OF INVENTION

Technical Problem

Even if a conventional inference device can simply reduce non-zero elements from a weight matrix, it does not necessarily result in the effect of reducing an array or a memory for storing the matrix. There is a disadvantage that, in a case where the positions of non-zero elements of a weight matrix are biased, no inference device can be obtained which is benefitted from the effect of reduction of the amount of memory.

The present invention has been made in order to solve the above disadvantage, and an object of the present invention is to obtain an inference device which is benefitted from the effect of reduction of the amount of memory.

Solution to Problem

An inference device according to the present invention uses a neural network and includes: a memory to store a layer on an input side and weight data for generating a matrix multiplication using the layer on the input side; and a processor to generate a layer on an output side, by using the layer on the input side and the weight data for generating the matrix multiplication using the layer on the input side, in which, out of a plurality of rows and columns including zero elements and non-zero elements in the weight data, the memory stores only non-zero weights and position information of the non-zero weights and the number of the non-zero elements in each of the rows is approximately the same, and the number of the non-zero elements in each of the columns is approximately the same, and in a case where layers of convolutional filters of a CNN correspond to the layer on the input side, a matrix is obtained, in which a height, a width, and input channels are included in one row and the number of output channels is the number of the rows, and the weight data is stored in the memory, as the weights that give the non-zero elements out of the plurality of rows and columns to be multiplied with the matrix.

Advantageous Effects of Invention

According to the present invention, it is possible to eliminate the bias in the positions of non-zero elements of a weight matrix and to obtain an inference device that enjoys the effect of reduction of the amount of memory.

DESCRIPTION OF EMBODIMENTS

First Embodiment

Even in conventional inference devices, it is possible to reduce the amount of operation or the amount of memory by reducing the number of non-zero elements of a weight matrix expressing weights of a neural network. It is further possible to reduce the circuit scale in a case of implementation by a digital circuit using a semiconductor integrated circuit.

However, even though non-zero elements can be simply reduced in a weight matrix, and even though the number of non-zero elements can be reduced on average, it does not always mean that it can have the effect of reducing an array or a memory for storing the matrix. In a case where the positions of non-zero elements in a weight matrix are biased, for example, in a case where there are 100 non-zero elements in one row and 10 non-zero elements in each of the other rows, a memory area equivalent to 100×the number of rows is required when the weight matrix is expressed by a two-dimensional array, which may not sufficiently reduce the amount of memory.

Moreover, especially in a case where multiplication and the sum are implemented in a digital circuit, it is necessary to consider the bit width after the multiplication and the sum are performed on output values of a preceding layer. In each of multiplication and the sum, the values of operation results have a larger bit width than that before the operation, however, in the sum, the bit width of the value of the sum result can be reduced as the number of additions can be reduced. However, in a case where the positions of non-zero elements in a weight matrix are biased, a lot of additions are required for the sum of a certain node, and the bit width of the value of the sum result is large, which results in a large bit width of the adder or a large bit width of a register that stores the sum result, thereby increasing the circuit scale.

In a case where a neural network is implemented by a digital circuit, it is common that one arithmetic circuit performs arithmetic operations of a plurality of layers or nodes and processes in a time-division manner. Therefore, it is necessary to be able to handle the node that has the largest number of additions among a plurality of nodes that a certain arithmetic unit is in charge of, and it is necessary to implement an arithmetic unit or a register having a bit width that corresponds to the node having the largest number of additions. In a case where the positions of non-zero elements in a weight matrix are biased, and a certain node requires a lot of additions, there are cases where the effect of reducing the circuit scale cannot be obtained even though the non-zero elements can be reduced in the weight matrix.

The technical creation having an effect in the above case will be described below in an embodiment of the present invention.

Figure 1:
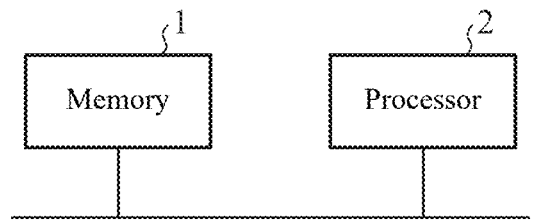
FIG. 1 is a hardware configuration diagram of an inference device of a first embodiment.

FIG. 1 is a hardware configuration diagram of an inference device of a first embodiment. Data is processed by a processor 2 using data stored in a memory 1. The memory 1 can be in various forms including a storage medium such as an HDD, a FLASH memory, and a normal memory, and the processor is not limited to a CPU but may also be an FPGA or a GPU.

Figure 2:
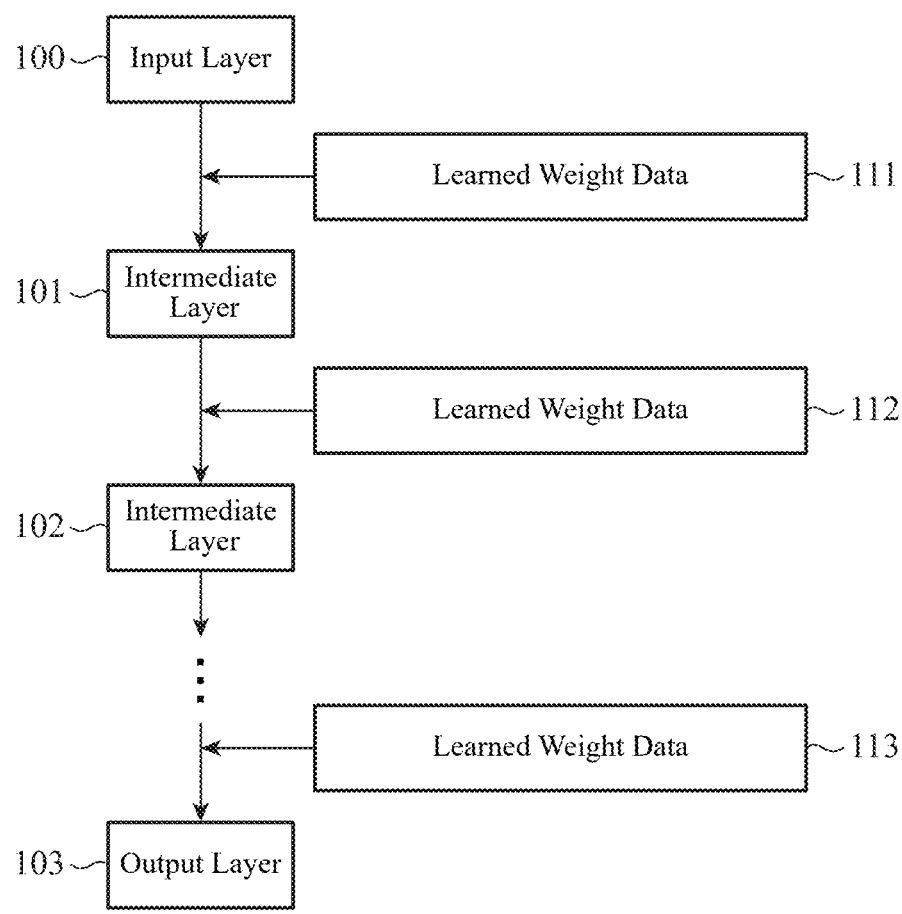
FIG. 2 is a diagram illustrating a neural network of the inference device of the first embodiment.

FIG. 2 is a diagram illustrating a neural network of the inference device in the first embodiment.

In FIG. 2, an input layer 100 including a plurality of nodes is a layer that is represented as a plurality of input values to a neural network, such as an image or sensor data. An input value to the neural network is output to an intermediate layer 101 through a process by the processor 2.

Generally, the intermediate layer 101 also includes a plurality of nodes. Each of the nodes of the intermediate layer 101 has a value obtained by, as necessary, applying a process such as an activation function on a value of an inner product of a vector expressing the plurality of nodes of the input layer 100 and a plurality of weights of learned weight data 111. The values of the intermediate layer 101 are calculated by the processor 2 and output to an intermediate layer 102.

From the above, expressing the values of the plurality of nodes of the input layer 100 as vector X and the learned weight data 111 as matrix W, the value of each of the nodes of the intermediate layer 101 can be expressed as Y=WX which is a product of the matrix. (The activation function may also be included in the matrix W).

Figure 3:
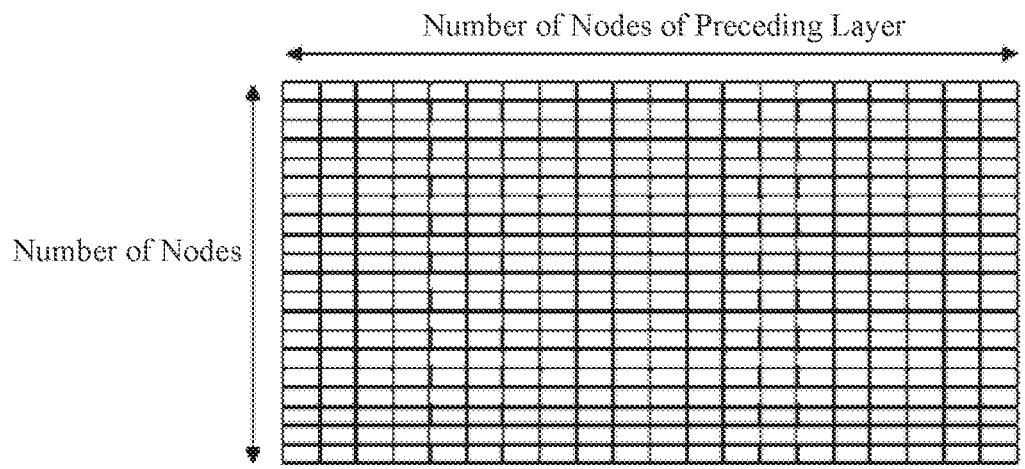
FIG. 3 is a diagram illustrating a weight matrix W in which learned weight data is expressed as a matrix in the first embodiment.

FIG. 3 is a diagram illustrating weight matrix W in which learned weight data is expressed as a matrix in the first embodiment.

The learned weight matrix W has as many rows as the number of nodes in the intermediate layer 101 and has as many columns as the number of nodes in the preceding layer (here, the input layer 100). As for the activation function, a sigmoid function, a softmax function, a ReLU function, or the like is used, however, the present invention can be carried out regardless of the type of activation function. Furthermore, as for a process to be applied to the value of the sum result, a normalization process such as addition of a bias value or batch normalization may be applied, however, the present invention can be carried out regardless of these operations or processes.

The intermediate layer 102 of FIG. 2 is calculated in a similar manner to the calculation process of the intermediate layer 101. The processor 2 calculates, as for the intermediate layer 102, values obtained by, as necessary, applying a process such as an activation function on the value of the sum result of a matrix multiplication of the output values of the intermediate layer 101 and learned weight data 112. No matter how many intermediate layers are present thereafter, this embodiment can be configured in a similar manner to the case of the intermediate layer 101.

Likewise, the processor 2 calculates, as for the output layer 103, values obtained by, as necessary, applying a process such as an activation function on the value of the sum result of a matrix multiplication of the output values of the preceding intermediate layer and learned weight data 113. Output of the output layer 103 is an output value of the neural network.

Note that values of respective nodes of the input layer 100, the intermediate layers 101 to 102, and the output layer nodes as well as the learned weight data 111 to 113 are stored in the memory 1.

Figure 4:
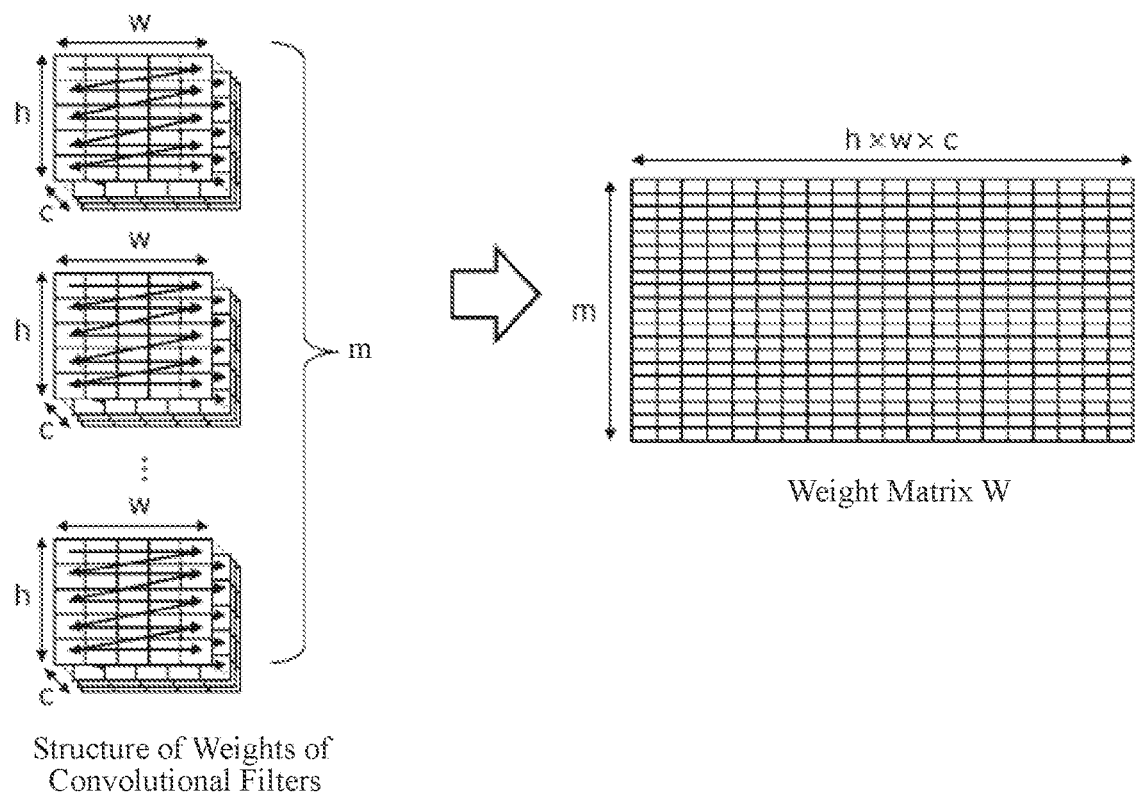
FIG. 4 is a diagram explaining learned weight matrix W in a case where the neural network in the first embodiment is a CNN.

In the above, the case of a hierarchical neural network has been described. Next, a case of a CNN will be described. FIG. 4 is a diagram explaining learned weight matrix W in a case where the neural network in the first embodiment is a CNN.

The layers of convolutional filters of a CNN have a data structure including height h, width w, c input channels, and m output channels, and the layers of the convolutional filters of the CNN can be expressed by matrix X of m rows and h×w×c columns. Therefore, assuming, as the learned weight data 111, weights W for the layers of the convolutional filters of the CNN represented by the matrix X of the m rows m and the h×w×c columns, the intermediate layer 101 can be expressed as a matrix multiplication of the matrix X that represents the output of the preceding layer (for example, the input layer 100) and the weight matrix W, that is, Y=WX. Therefore, similarly, even when the intermediate layer 101, the intermediate layer 102, and the output layer 103 of FIG. 1 constitute a neural network of a CNN structure, the present invention can still be carried out.

Similarly, also in RNNs and their types, LSTMs and GRUs, multiplication of weights and input values of an intermediate layer and the sum, and multiplication of weights and median values based on past input values and sum can each be expressed as multiplication of a matrix, and the present invention can also be carried out by replacing the intermediate layers 101 and 102 in FIG. 2 with units having a recurrent structure included in an RNN, an LSTM, or a GRU.

In general, CNNs are often used for recognition of a video, and RNNs and their types, LSTMs and GRUs, are often used for recognition of audio.

In the above, configurations of a neural network using a general W have been described. In the following, description will be given on processes using a weight matrix and a neural network with a reduced circuit scale.

Figure 5:
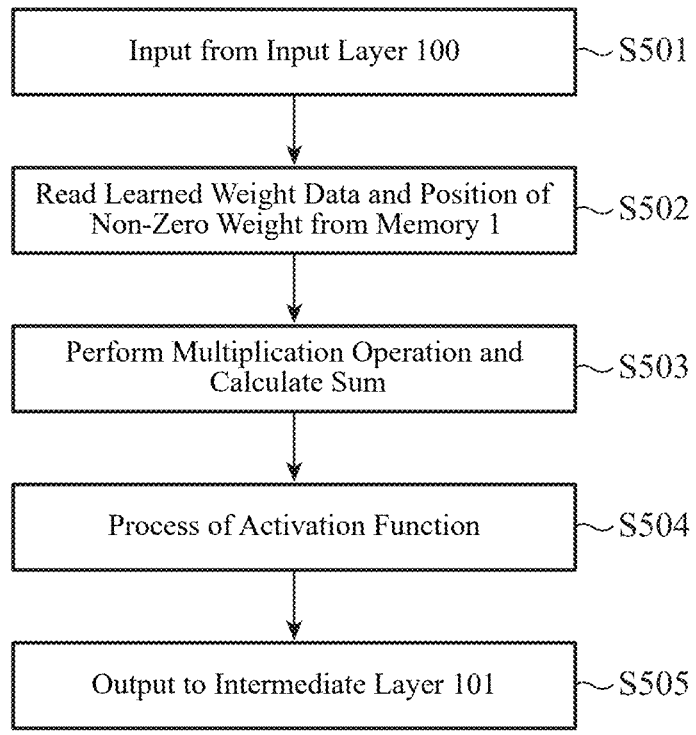
FIG. 5 is a flowchart illustrating processes from input from an input layer 100 to output to an intermediate layer 101 in the first embodiment.

FIG. 5 is a flowchart illustrating processes from input from the input layer 100 to output to the intermediate layer 101 in the first embodiment. As a matter of course, the configuration of the flowchart can also be applied to the intermediate layers 101 and 102 and the output layer 103.

In step S501, the processor 2 acquires values of the respective nodes from the input layer 100 from the memory 1, and in step S502, the processor 2 acquires position information of non-zero weights that are not zero in the weight data 111 together with the none-zero weight data 111 that is not zero and has been learned from memory 1.

As for the learned weight data, the memory 1 stores only non-zero values and their position information out of elements of a learned weight matrix containing many elements having zero values. The learned weight data has a smaller address size stored in the memory as compared to r×c, which is multiplication of the number of columns c and the number of rows r of the weight matrix W. The present invention is characterized in that the number of non-zero elements contained in each row of weight matrix W is uniform and that the address size is smaller than r×c.

In many programming languages such as C, in order to store a weight matrix in a two-dimensional array, the address size in the column direction is required only for the maximum value k of the number of non-zero elements contained in each row, and it is necessary to allocate an amount of memory that can store k weights to all rows. Even in a case where the number of non-zero elements is small on average or the total number of non-zero elements is small, it is necessary to ensure the amount of memory on the basis of the row having the largest number of non-zero elements. Alternatively, in a case where only non-zero elements are stored by, for example, disposing the memory in one dimension in order to avoid the above, a separate memory is required for storing data indicating how many non-zero elements are included in which row. This uses more amount of memory as compared with the present invention.

As a matter of course, in a case where the total number n of non-zero elements cannot be divided by the number of rows r, a fraction occurs. In that case, the number of non-zero elements contained in each row is an integer around n/r, which can be configured by the present embodiment, and the effect of memory reduction can be achieved. Moreover, as a matter of course, zero weights may be stored in a learned weight data storing memory 211 and treated in a similar manner to that of non-zero weights as long as it does not affect the amount of operation or the amount of memory.

Figure 6:
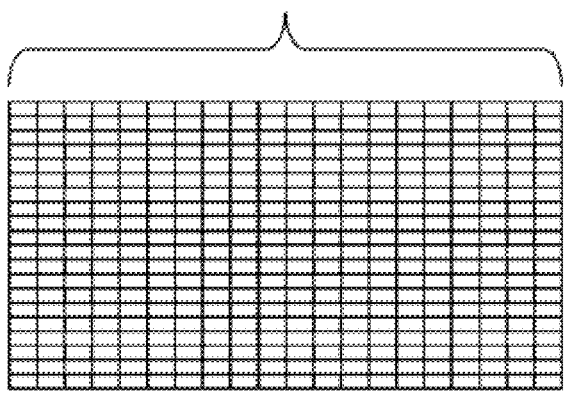
FIG. 6 is a diagram illustrating an example of a memory in which the weight matrix W and its elements are stored in the first embodiment.
Figure 6:
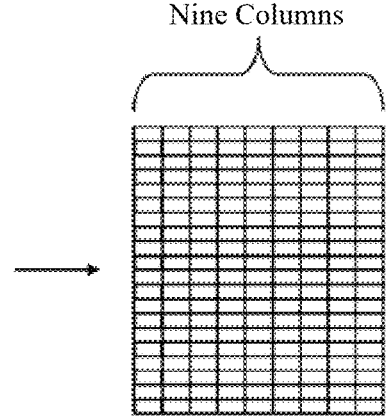

FIG. 6 is a diagram illustrating an example of a memory in which weight matrix W and its elements are stored in the first embodiment. Even when the number of non-zero elements contained in weight matrix W is the same as the example in FIG. 5, that is, 180, in a case where the number of non-zero elements belonging to each row is not uniform, and the number of non-zero elements in the row having the largest number of non-zero elements is value k>9, a memory of 20×k>180 is required.

Here, if the number of non-zero elements belonging to each row is uniformly nine when a weight matrix having a size of 20×20 is stored in a memory, the address size in the memory can be 20×9.

Furthermore, in addition to making the number of non-zero elements contained in each row of the weight matrix W uniform, the number of non-zero elements contained in each column of the weight matrix W may be made uniform. Assuming that the number of non-zero elements contained in each column of the weight matrix W is not uniform, it means that the number of times the operation is omitted (since the weight is zero) differs depending on each value of the output of the preceding layer. In such a case, a plurality of values contained in the output of the preceding layer is treated in a biased manner for each value, and in an extreme case, some values are not used for the operation in the intermediate layer 101. In such a case, performance indices such as the image recognition rate of output of the neural network may be deteriorated. If the number of non-zero elements contained in each column of the weight matrix W is made uniform, performance indices such as the image recognition rate of output of the neural network can be maintained high.

Since the position information of a non-zero weight indicates the position of the non-zero element for each row, in a case where the number of non-zero elements is not uniform for each row, a larger amount of memory is required. The position information of a non-zero weight can result in the effect of reducing the amount of memory if the number of non-zero elements contained in each row is made uniform.

Note that the position information of non-zero weights is required in many cases regardless of whether or not the characteristics of the present invention are implemented. This is because if the positions of non-zero weights are unknown, multiplication for the zero weights cannot be omitted in multiplication operation, and the effect of reducing the amount of operation cannot be obtained. The position information of non-zero weights is not a function nor a memory additionally required for carrying out the present invention and does not cause an increase in the amount of memory as compared with the prior art.

In step S503 of FIG. 5, a multiplication operation is performed on the basis of values of the respective nodes of the input layer 100 obtained from the memory 1, the learned weight data 111, and the position information of non-zero weights of the respective pieces of weight data, and the sum that can be a value of each node of the intermediate layer 101 is calculated.

In multiplication operation, multiplication operation of the values of the respective nodes of the input layer 100 and the weights is performed, by using the learned weight data 111, each pieces of weight data, and the position information of non-zero weights of each pieces of weight data.

As described above, the input layer 100 can be expressed by a vector or matrix X, and elements of X to be multiplied with weight data is selected on the basis of the position information of weight data in the learned weight matrix, and then products with the weight data are calculated.

The sum that can be a value of each node of the intermediate layer 101 is not calculated for all the products obtained by the multiplication operation, but as described above, it can be expressed by product WX of the matrix, and the values obtained as a result of calculating a product for every element in each row of W and each column of X are to be summed up.

Therefore, in a case where the number of non-zero elements belonging to a certain row of the weight matrix W is h, the number of values to be summed up is h, and thus addition is required for (h−1) times. In a case where h values are summed up in a digital circuit, when the bit width of the values to be summed is b, the bit width of the sum result is b+log 2h bits (digits after a decimal point are rounded up), and a register or an adder for holding the sum result needs a bit width of this number of bits. If a register for this number of bits or an adder of this bit width is not implemented, digit loss will occur, and it is either that the accuracy of operation bits will drop or that no correct sum can be obtained.

In a case where the number of non-zero elements in a weight matrix is not uniform, a large bit width is required for the sum of rows having a large number h of non-zero elements, and the number of bits in the adder or the number of bits in the register storing the sum result increase, and the circuit scale increases, however, the circuit scale can be reduced by making the number of non-zero elements of a weight matrix uniform as in the present invention.

In a case where a neural network is implemented by a digital circuit, it is common that one arithmetic circuit performs arithmetic operations of a plurality of layers or nodes and processes in a time-division manner. Therefore, in a case where the number of non-zero elements is not uniform in each row of the weight matrix, it is necessary to implement an arithmetic unit or a register of a bit width corresponding to the node that has the largest number of additions among a plurality of nodes for which the sum performed in a time division manner by a certain arithmetic unit. By making the number of non-zero elements uniform in each row of the weight matrix, the effect of reducing the circuit scale can be obtained.

In step S504 of FIG. 5, in the process of an activation function, normalization process such as addition of a bias value, an activation function, or batch normalization is applied to the sum, and the result is output as the intermediate layer 101 in step S505. Although various methods have been proposed for the order of these processes, the present embodiment can be configured in any order. Moreover, a part or all of these processes may not be carried out.

Note that there are various methods for determining whether or not these processes can be performed and how to determine the number of non-zero elements per column or row. For example, increasing the degree of agreement with the correct answer of image or sound determination by learning, in general, result in an increased number of non-zero elements, whereas the number of non-zero elements can be reduced by imposing a constraint such as guaranteeing the degree of agreement of determination to a certain extent or limiting to those whose performance is most guaranteed among required number of non-zero elements, and the amount of memory can be reduced.

There are also various manners with regards to the arrangement in which the number of non-zero elements is uniform in each row of a weight matrix.

For example, there is a method in which only the number of non-zero elements is determined as a constraint condition in each row and the positions are randomly arranged, or there is a method in which non-zero elements are arranged cyclically. The cyclic manner may be, for example, not only every other one or two, but also two consecutive non-zero elements may be cyclically arranged, or three or more non-zero elements may be consecutively arranged cyclically.

Furthermore, if the position pattern of non-zero elements is indexed, it is only the index information with no position information of the non-zero elements stored in the memory 1, and thus a further memory reduction effect can be expected.

Therefore, by selecting a position pattern of non-zero elements that can sufficiently guarantee the degree of agreement in image or sound determination by learning from some of these candidates, it is possible to obtain the memory reduction effect while also maintaining the degree of agreement in the image or sound determination.

According to the embodiments as described above, the inference device of a neural network includes: the memory 1 for storing a layer on an input side and weight data for generating a matrix multiplication using the layer on the input side; and a processor 2 for generating a layer on an output side, by using the layer on the input side and the weight data for generating the matrix multiplication using the layer on the input side, in which, out of a plurality of rows and columns including zero elements and non-zero elements in the weight data, the memory 1 stores only non-zero weights and position information of the non-zero weights, and the number of non-zero elements in each of the rows is approximately the same. Therefore, it is possible to reduce the amount of memory in the memory for storing learned weight data of the weight matrix. It is also possible to reduce the amount of memory of a memory for storing positions of non-zero weight elements of the weight matrix.

Furthermore, in the sum after multiplication operation performed in intermediate layers and an output layer of a neural network, the number of values to be summed up can be reduced by making the number of non-zero elements uniform in each row of a weight matrix. Thus, in a case where the inference device is implemented by a digital circuit, the bit width of an adder and the bit width of a register for holding the sum result can be reduced, and therefore the effect of reducing the circuit scale can be obtained.

It is expected to be applied in edge fields in which the capability of the processor 2 or the memory 1 is likely to be restricted. Examples of expected application include use in video recognition of vehicles or sound recognition in a passenger compartment in automobiles, position control of robots using cameras or abnormality detection by images of products in the field of factory automations, and abnormality determination by sound or images of production facilities.

REFERENCE SIGNS LIST

1: memory, 2: processor, 100: input layer, 101: intermediate layer, 102: intermediate layer, 103: output layer, 111 to 113: learned weight data

The invention claimed is:

1. An inference device comprising:
a memory to store a layer on an input side and weight data for generating a matrix multiplication using the layer on the input side; and
a processor to generate a layer on an output side, by using the layer on the input side and the weight data for generating the matrix multiplication using the layer on the input side,
wherein the inference device uses a neural network, and in the neural network, out of a plurality of rows and columns including zero elements and non-zero elements in the weight data, the inference device reduces an amount of memory in the memory for storing learned weight data of the matrix by:
storing only weights that give the non-zero elements and position information of the weights that give the non-zero elements in the memory,
setting approximately a same number of the non-zero elements in each of the rows, and
setting approximately the same number of the non-zero elements in each of the columns, and
in a case where layers of convolutional filters of a convolutional neural network (CNN) correspond to the layer on the input side, a matrix is obtained, in which a height, a width, and input channels are included in one row and the number of output channels is a number of the rows, and the weight data is stored in the memory, as the weights that give the non-zero elements out of the plurality of rows and columns to be multiplied with the matrix.

2. The inference device according to claim 1, wherein the memory stores only non-zero weights and position information of the non-zero weights of the weight data in which the zero elements and the non-zero elements are randomly arranged in each of the rows.

3. The inference device according to claim 1, wherein the memory stores only non-zero weights and position information of the non-zero weights of the weight data in which the zero elements and the non-zero elements are cyclically arranged in each of the rows.

4. The inference device according to claim 1, wherein the memory stores, as index information, the position information of the non-zero weights of the weight data.

5. An inference method using a neural network, the method comprising:
generating a layer on an output side by using a layer on an input side that is stored in a memory and weight data for generating a matrix multiplication using the layer on the input side,
wherein, in the neural network, out of a plurality of rows and columns including zero elements and non-zero elements in the weight data, the method comprises reducing an amount of memory in the memory for storing learned weight data of the matrix by:

storing only weights that give the non-zero elements and position information of the weights that give the non-zero elements in the memory, setting approximately a same number of the non-zero elements in each of the rows, and setting approximately the same number of the non-zero elements in each of the columns, and in a case where layers of convolutional filters of a convolutional neural network (CNN) correspond to the layer on the input side, a matrix is obtained, in which a height, a width, and input channels are included in one row and the number of output channels is a number of the rows, and the weight data is stored, as the weights that give the non-zero elements out of the plurality of rows and columns to be multiplied with the matrix.

* * * * *